(12) United States Patent
Luke et al.

(10) Patent No.: US 8,018,714 B2
(45) Date of Patent: Sep. 13, 2011

(54) PORTABLE ELECTRONIC DEVICE AND OPERATION METHOD THEREFOR

(75) Inventors: Hok-Sum H Luke, Taoyuan (TW); Ying-Yen Cheng, Taoyuan (TW); Ying-Xing Lee, Taoyuan (TW); I-Cheng Chuang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 68 days.

(21) Appl. No.: 12/499,264

(22) Filed: Jul. 8, 2009

(65) Prior Publication Data
US 2010/0149733 A1 Jun. 17, 2010

(30) Foreign Application Priority Data
Dec. 17, 2008 (TW) ................................ 97149232 A

(51) Int. Cl.
*G06F 1/16* (2006.01)
(52) U.S. Cl. ............. 361/679.01; 455/575.3; 248/349.1; 400/575.3
(58) Field of Classification Search ............. 361/679.26, 361/679.27, 679.29, 679.55, 679.56; 455/575.1, 455/575.2, 575.3; 248/349.1; 400/575.3
See application file for complete search history.

(56) References Cited

U.S. PATENT DOCUMENTS

| | | | |
|---|---|---|---|
| 2006/0293094 A1 | 12/2006 | Kilpi et al. | |
| 2008/0080919 A1 | 4/2008 | Rak et al. | |
| 2008/0304215 A1 | 12/2008 | Chiu | |
| 2008/0304217 A1 | 12/2008 | Lai et al. | |
| 2010/0035666 A1* | 2/2010 | Chang et al. | ............... 455/575.1 |

FOREIGN PATENT DOCUMENTS
EP 1916826 4/2008

OTHER PUBLICATIONS

Extended European Search Report dated Oct. 15, 2009 from corresponding EPO Application No. 09166593.5.

* cited by examiner

*Primary Examiner* — Hung Duong
(74) *Attorney, Agent, or Firm* — Grossman, Tucker, Perreault & Pfleger, PLLC

(57) ABSTRACT

A portable electronic device and an operation method therefor are provided. The portable electronic device comprises a first body portion, a second body portion, a sliding module and a rotating module. After the second body portion is slid along the surface of the first portion by the sliding module, the rotating module is promptly triggered to automatically rotate the second body portion to a first angle with respect to the first body portion. The second body portion can be further rotated to a second angle when the second body portion bears a thrust force at the first angle. The portable electronic device can operate in corresponding operation modes according to the angles that the second body portion presents with respect to the first body portion.

23 Claims, 9 Drawing Sheets

PORTABLE ELECTRONIC DEVICE AND OPERATION METHOD THEREFOR

This application claims the benefits of the priority based on Taiwan Patent Application No. 097149232 filed on Dec. 17, 2008, the disclosures of which are incorporated herein by reference in their entirety.

CROSS-REFERENCES TO RELATED APPLICATIONS

Not applicable.

BACKGROUND OF THE INVENTION

1. Field of the Invention

The present invention provides a portable electronic device, and in particular, a portable electronic device with a plurality of operation modes and configurations.

2. Descriptions of the Related Art

With the advancement of manufacturing processing and mobile communication technologies, portable electronic devices are becoming increasingly popular and also gradually miniaturized in size. To satisfy the various demands of users, portable electronic devices can be designed into different structures to provide users with more diversified operation styles.

For example, to allow users to browse information displayed on the screens of the portable electronic devices more clearly and input relatively complex instructions, current portable electronic devices are designed with both a larger and wider display and a keyboard comprising multiple keys. Because these components occupy a large volume, common portable electronic devices currently available have either a clamshell or slide design for convenience.

The operation of a portable electronic device 1 with a slide design is shown in FIGS. 1A and 1B. The portable electronic device 1 comprises a first body portion 11 and a second body portion 13, in which the first body portion 11 is provided with a keyboard 111 and the second body portion 13 is provided with a display 131. In more detail, FIG. 1A illustrates a configuration where the portable electronic device 1 is closed. In this configuration, the portable electronic device 1 mainly exposes the display 131 at the front of the second body portion 13 and keys 15 located at the side to apply general operations such as simple instruction input, incoming call answering and so on. In reference to FIG. 1B, when the input of a relatively complex instruction with the keyboard is needed, the second body portion 13 can be slid with respect to the first body portion 11 to expose the keyboard 111.

Hence, when using the conventional portable electronic device, the user can only rely on himself or herself to adjust the portable electronic device to a particular angle with respect to the user's eyes for comfortable watching depending on the different use conditions and environmental brightness. In other words, when the user operates the portable electronic device at different operational conditions (e.g., held in a hand or placed on a desk), the optimal viewing angle of the portable electronic device may vary. Hence, using the portable electronic device under different conditions by only adjusting the orientation in which it is held in the hand by the user would fail to satisfy the user's needs during an extended time of use, thereby causing inconvenience.

In view of this, this invention provides a portable electronic device that can operate at various viewing angles despite the different conditions in which the device may be used.

SUMMARY OF THE INVENTION

One objective of this invention is to provide a portable electronic device. By using a sliding module and a rotating module, particular structures of the portable electronic device can be tilted at a certain angle automatically subsequent to the sliding movement. Then, the user may make a further adjustment as desired so that the portable electronic device of this invention can provide various displaying orientations, a plurality of operation modes and configurations to satisfy diversified needs in use.

Another objective of this invention is to provide a method of operating a portable electronic device. This method enables the portable electronic device to operate under different operation modes corresponding to different configurations with respect to the portable electronic device at different angles, thereby improving the convenience of the device.

This invention provides a portable electronic device comprising a first body portion, a second body portion, a sliding module and a rotating module. The sliding module and the rotating module are connected to the first body portion and the second body portion respectively so that through the cooperation of the sliding module with the rotating module, the second body portion can slide from the first position (a closed configuration) to the second position (an open configuration) with respect to the first body portion and is then rotated to the third position (the second body portion is at a first angle with respect to the first body portion) automatically. Afterwards, the second body portion, when being subjected to a thrust at the third position, may be further rotated to a fourth position (the second body portion is at a second angle with respect to the first body portion). The second body portion can be adjusted to any angle (called as a third angle) within a particular range (between the first angle and the second angle) depending on the user's preferences and environmental conditions to provide a free stop design. Alternatively, after the second body portion is automatically tilted to the first angle, the user may apply a force to further rotate the second body portion automatically to another predetermined angle (may be the second angle described above) to accomplish the so-called click-point adjustment. The portable electronic device of this invention may also be designed with a plurality of click points to satisfy the different needs of users and deliver the optimal effect.

In the portable electronic device disclosed in this invention, during the process of sliding the second body portion from the first position to the second position, the structural relationship that the second body portion and the first body portion abut against each other will restrict the rotating module from any movement. Hence, no additional locking, braking or interfering device is needed to prevent the actuation of the rotating module during the sliding process of the second body portion.

Furthermore, the portable electronic device of this invention may perform different operation modes when the second body portion presents the aforesaid different configurations with respect to the first body portion. For instance, when the second body portion is at the first position, the portable electronic device may perform a first operation mode correspondingly; when the second body portion is at the second or the third position, the portable electronic device is adapted to perform a second operation mode; and when the second body portion is further adjusted to a fourth position with respective to the first body portion, the portable electronic device is adapted to perform a third operation mode. Thus, the user is able to operate the portable electronic device quickly and conveniently.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2A:
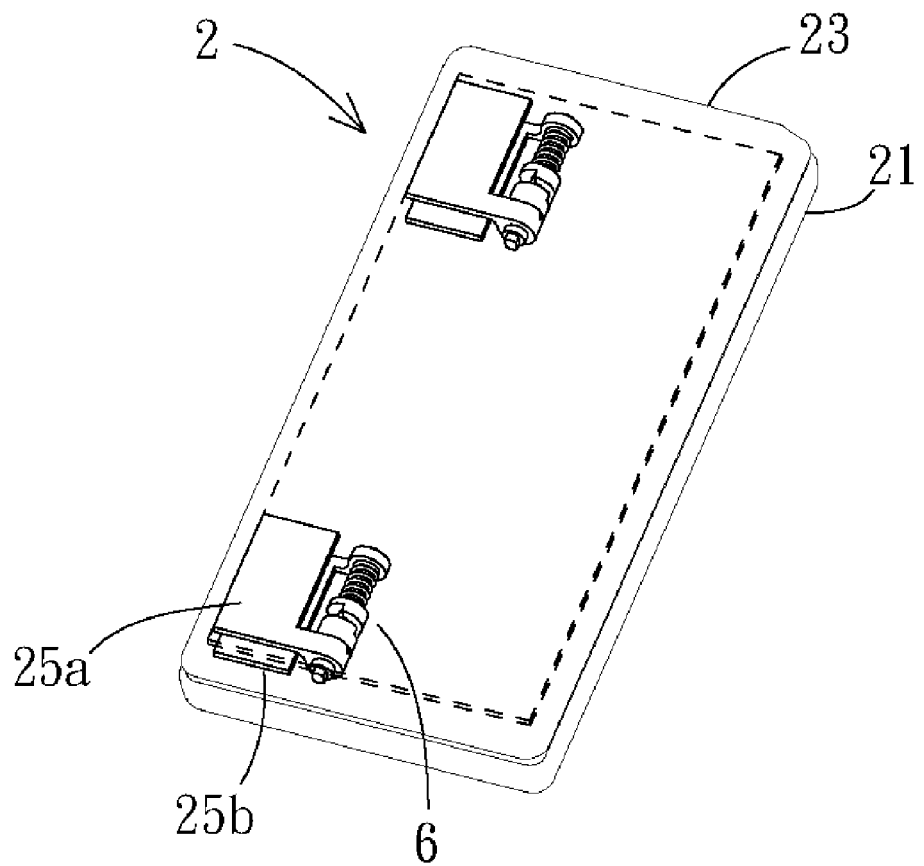
FIGS. 2A and 2B are schematic views of a portable electronic device of this invention in a closed configuration.
Figure 2B:
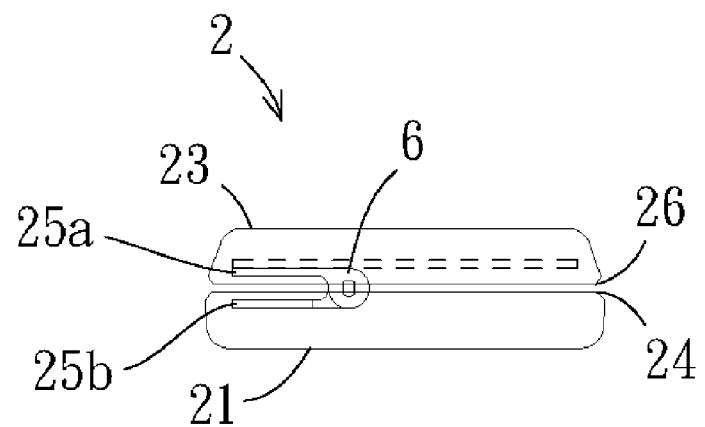
Figure 3A:
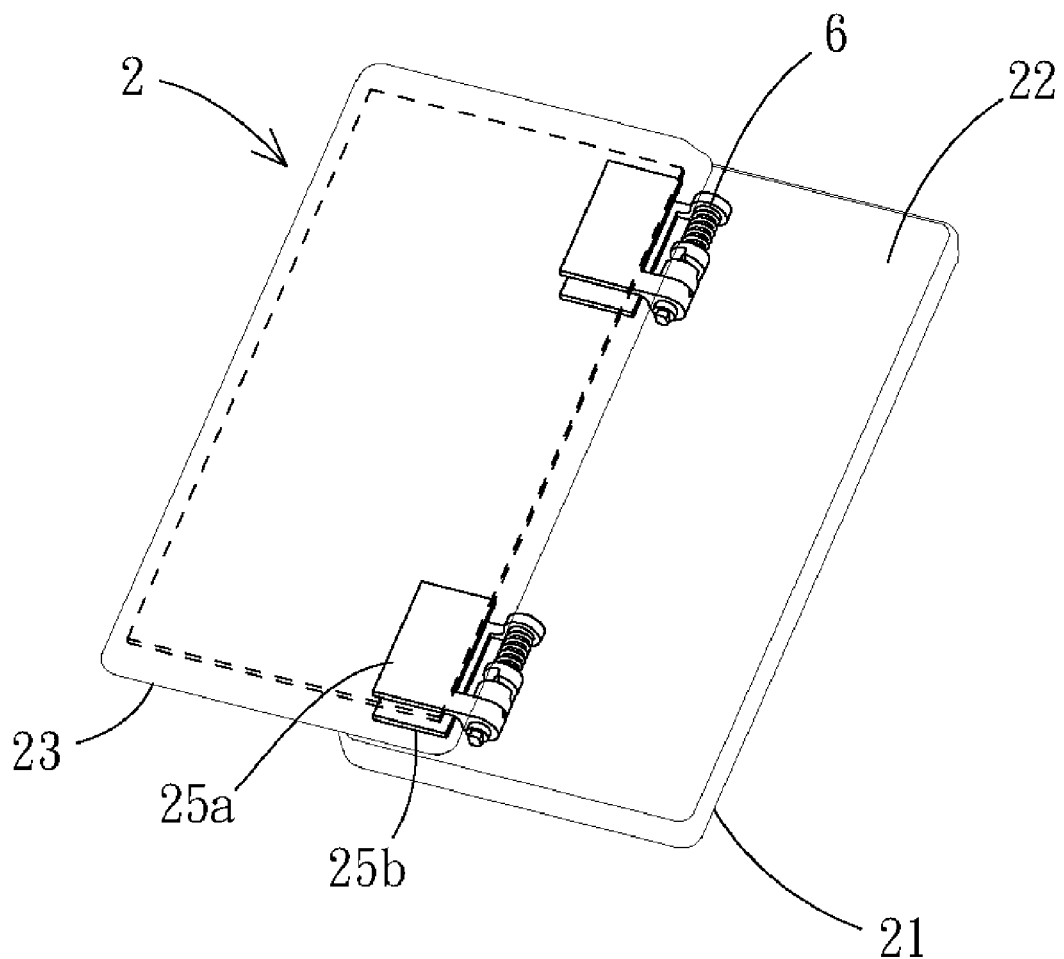
FIGS. 3A and 3B are schematic views of the portable electronic device of this invention in an open configuration.
Figure 3B:
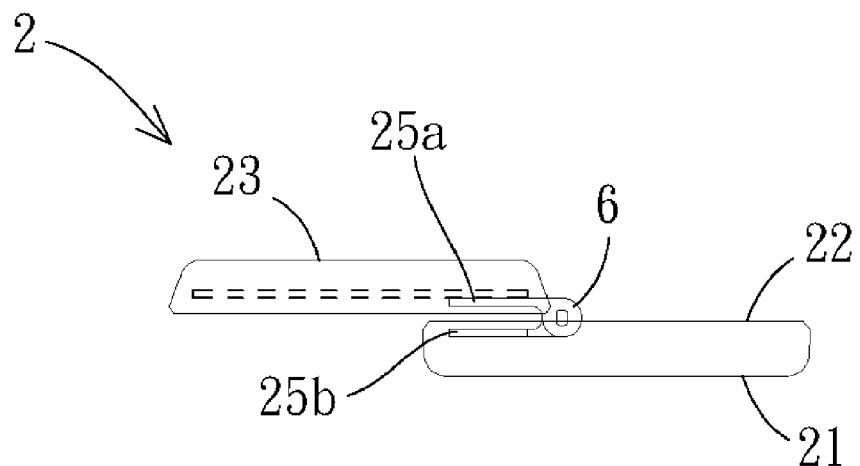
Figure 4A:
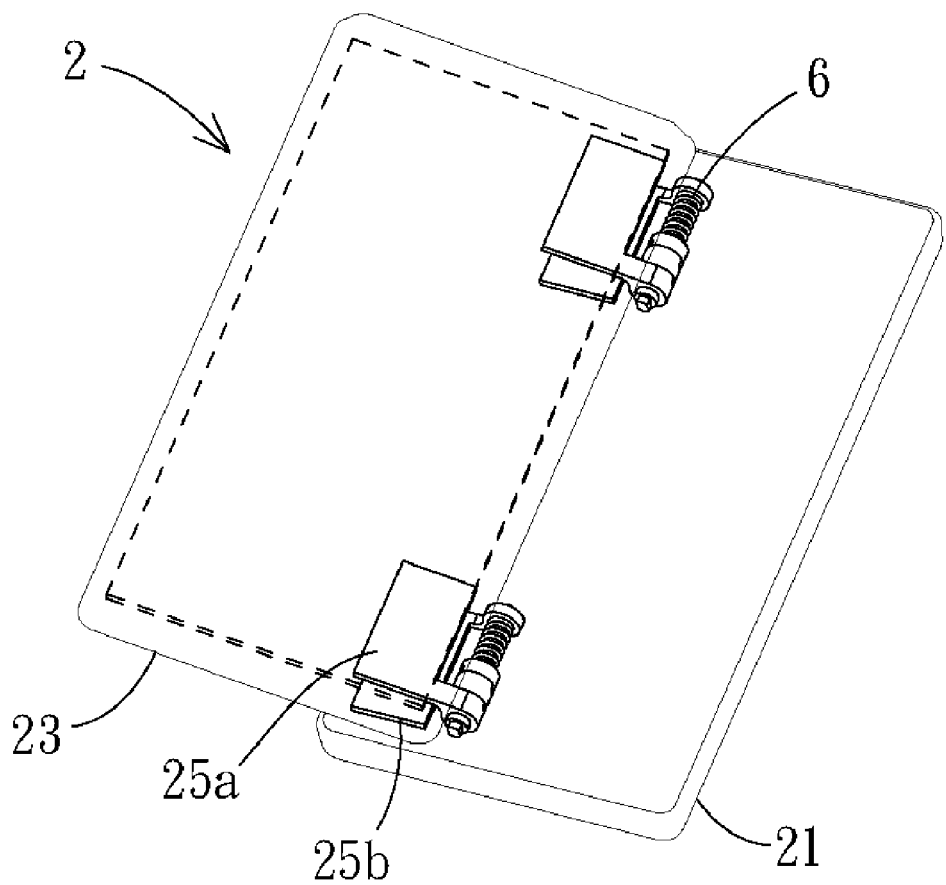
FIGS. 4A and 4B are schematic views of the portable electronic device of this invention in an automatic tilting configuration.
Figure 4B:
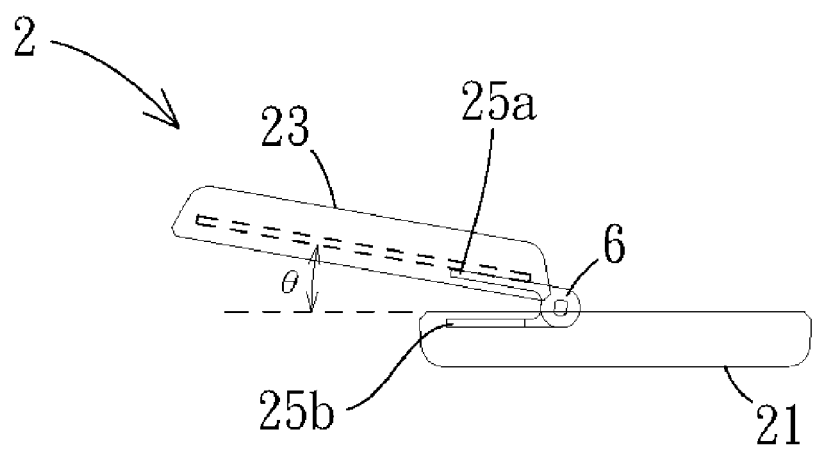
Figure 5A:
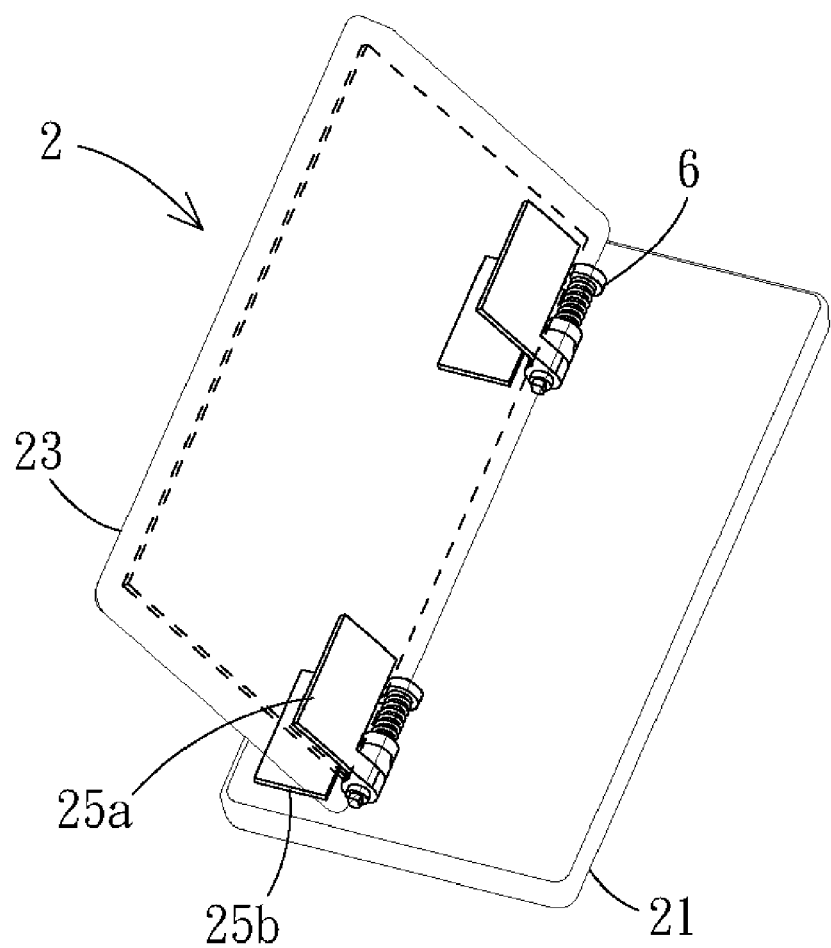
FIGS. 5A and 5B are schematic views of the portable electronic device of this invention in another operation configuration.
Figure 5B:
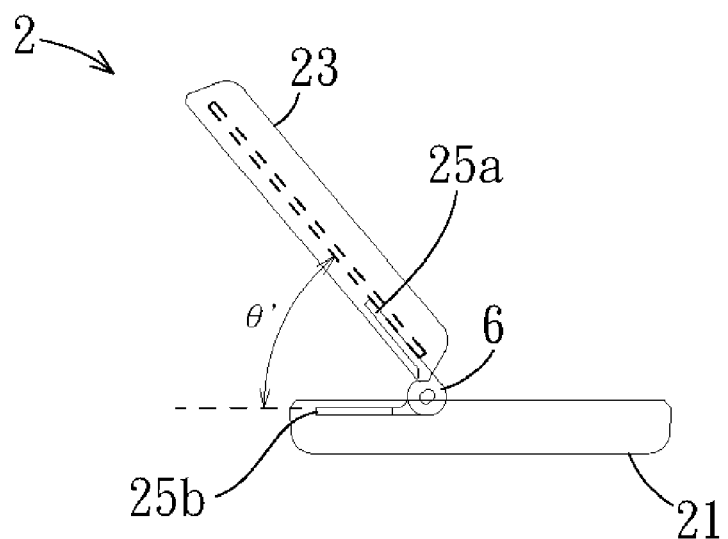

Different operation configurations of a portable electronic device 2 according to the embodiment of this invention are depicted in FIGS. 2A through 5B. The portable electronic device 2 primarily consists of a first body portion 21, a second body portion 23, a sliding module (not shown) and a rotating module 6. The sliding module and the rotating module 6 are connected to the first body portion 21 and the second body portion 23 respectively. The second body portion 23 is adapted to slide from the first position as shown in FIGS. 2A and 2B (where the portable electronic device 2 is in a closed configuration) to the second position as shown in FIGS. 3A and 3B (where the portable electronic device 2 is in an open configuration) along a surface 22 of the first body portion 21 by the sliding module. In this embodiment, the portable electronic device 2 has two rotating modules 6. As shown in FIGS. 4A and 4B, after the second body portion 23 slides to the second position (in the closed configuration), the rotating module 6 presents a movable configuration and drives the second body portion 23 to automatically rotate to the third position with respect to the first body portion 21 (where the second body portion 23 is at a first angle θ with respect to the first body portion). Furthermore, as shown in FIGS. 5A and 5B, when subjected to a thrust at the third position (at the first angle θ), the second body portion 23 is adapted to rotate from the third position to the fourth position. In the fourth position, the second body portion 23 is at a second angle θ' with respect to the first body portion, where the second angle θ' is greater than the first angle θ.

Figure 1A:
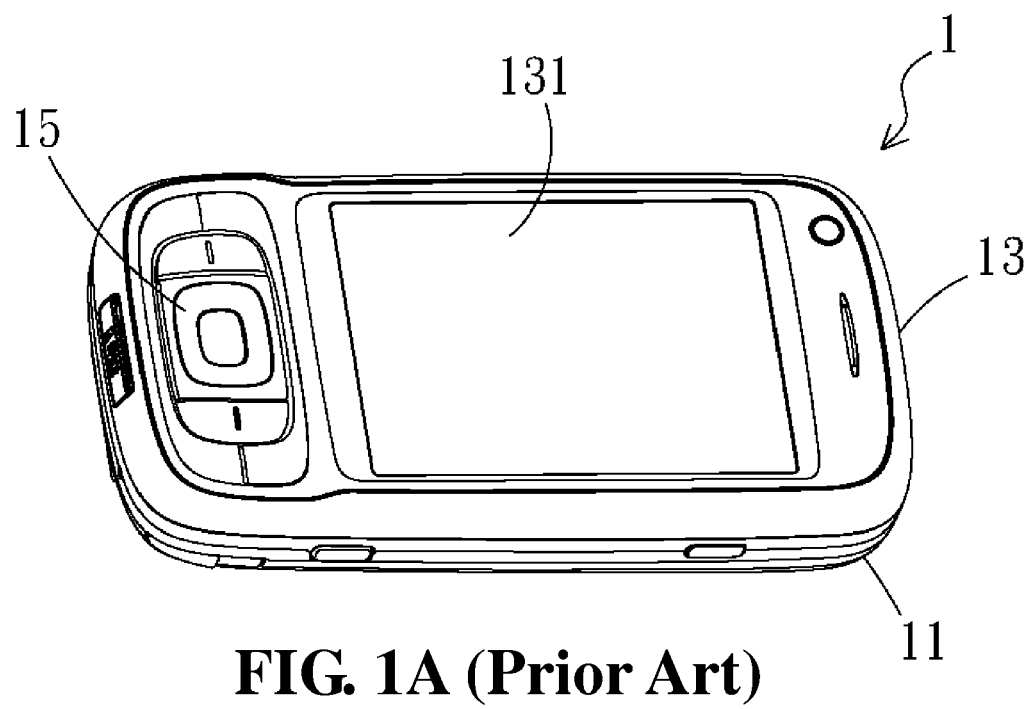
FIGS. 1A and 1B are schematic views illustrating how to operate a conventional portable electronic device of a slide type.
Figure 1B:
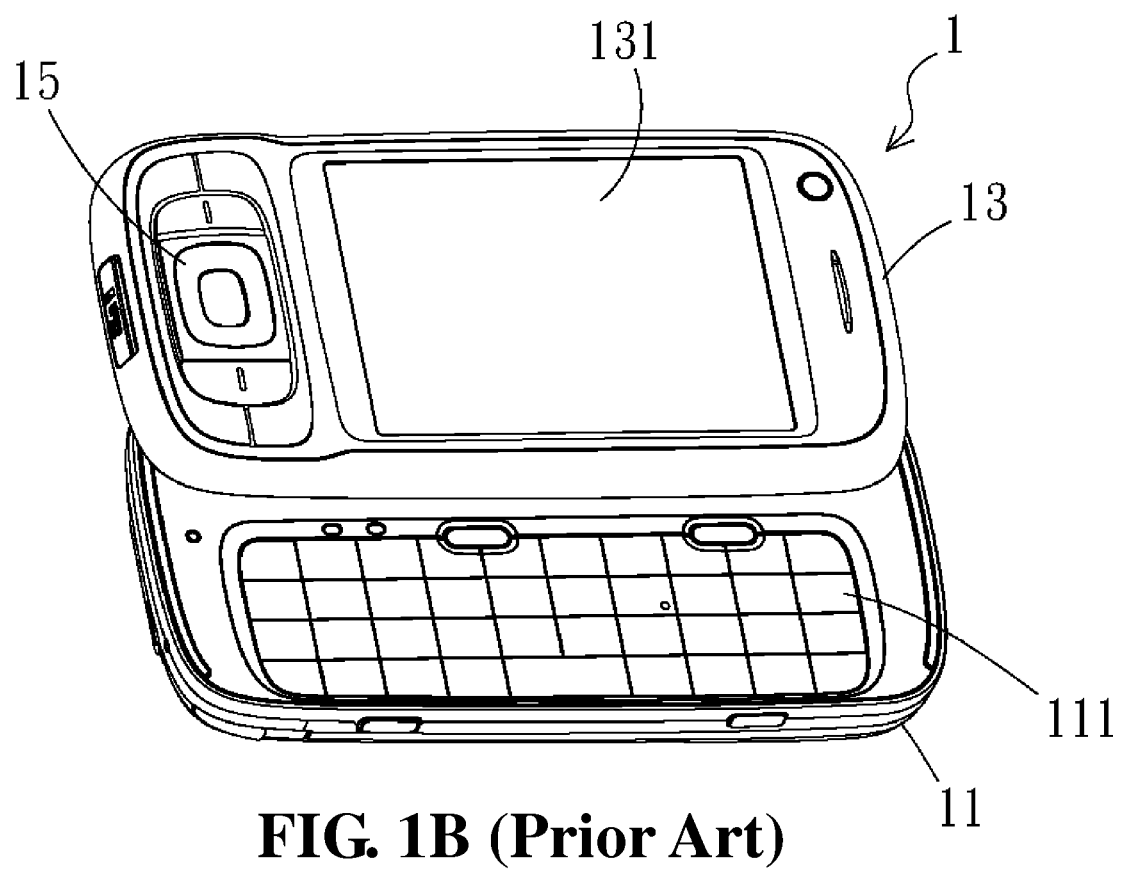

Similar to the conventional portable electronic device 1 shown in FIGS. 1A and 1B, the portable electronic device 2 of this embodiment may comprise a display (e.g., a touch screen, not shown) disposed on the second body portion 23. At the first position, the portable electronic device 2 is capable of performing a first operation mode, e.g., displays an image in a portrait mode, in order for the user to communicate with the portable electronic device 2 via the touch screen, i.e., to accomplish a human-machine interface (HMI) functionality. Also, the portable electronic device 2 further comprises a keyboard module (not shown) disposed on the surface 22 of the first body portion 21, which allows the user to input data or operate the portable electronic device 2 to communicate therewith, thereby also accomplishing the HMI functionality. In other words, the first body portion 21 and the second body portion 23 may comprise the HMI device respectively and have different configurations by relative movement. Additionally, the portable electronic device 2 may further comprise a power storage device (not shown) disposed within the first body portion 21. The keyboard module and the power storage device increase the weight of the first body portion 21 so that when the second body portion 23 rotates with respect to the first body portion 21, the center of gravity of the portable electronic device 2 still remains at the first body portion 21 without being turned over.

Figure 6:
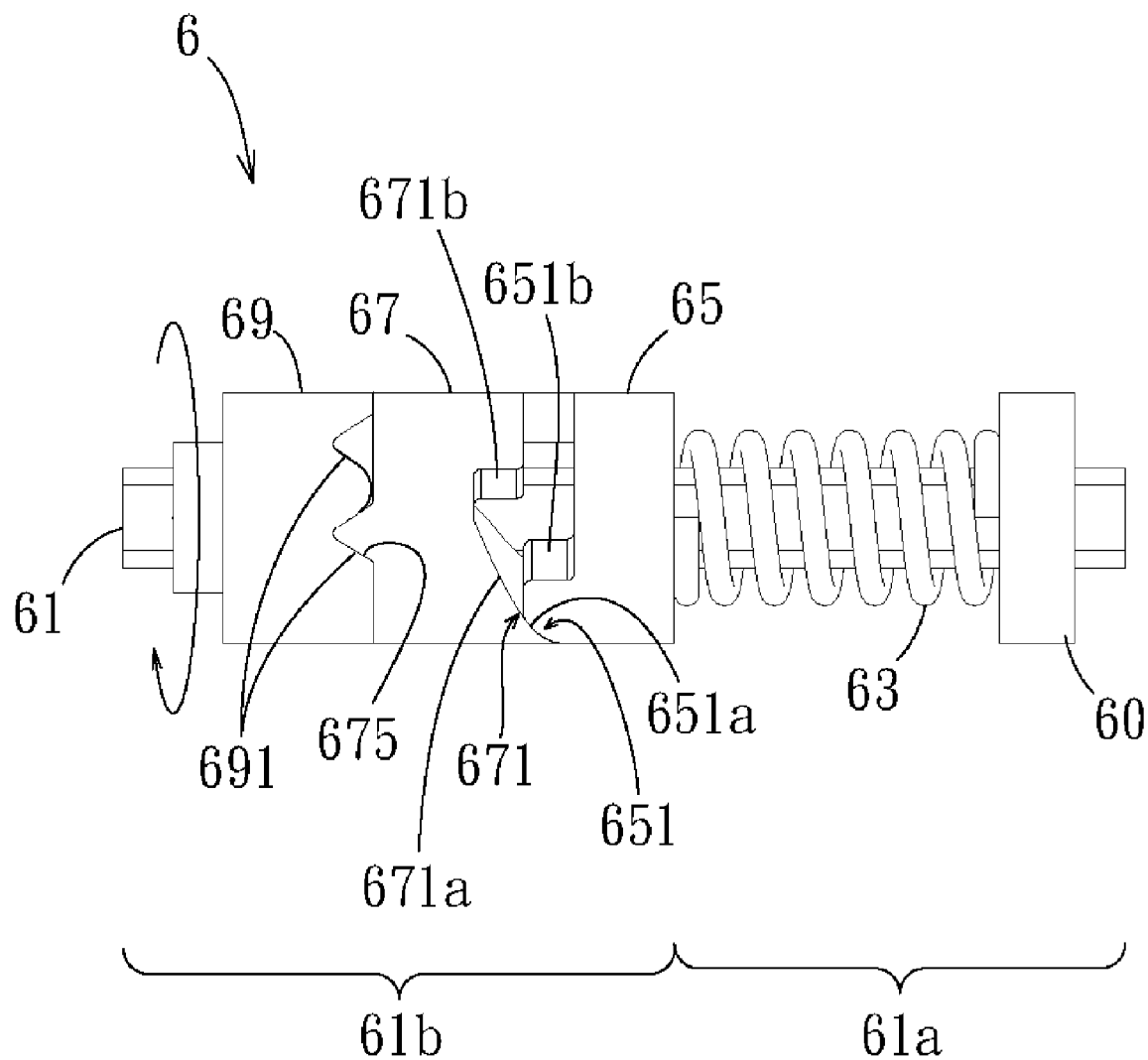
FIG. 6 is a schematic view of an embodiment of a rotating module of this invention.

More specifically, the rotating module 6 of the portable electronic device 2 comprises an energy storage device. After the second body portion 23 slides to the second position, the energy release by the energy storage device is adapted to drive the second body portion 23 to the third position (i.e., to the first angle θ). As shown in FIG. 6, the rotating module 6 of this embodiment is preferably a multi-stage hinge assembly, the energy storage device is a spring 63, and the rotating module 6 comprises a cam structure. The rotating module 6 connected to the second body portion 23 so that energy released from the spring 63 changes the position of the cam structure to rotate the second body portion 23.

In more detail, the rotating module 6 comprises a stopper 60, a spindle 61, a spring 63, a first movable component 65 and a second movable component 67. The spindle 61 is in the form of a long rod, and for purposes of disclosure and description, the spindle 61 may be defined to comprise a first portion 61a and a second portion 61b. The stopper 60 is fixedly disposed on the first portion 61a of the spindle 61 opposite the first movable component 65, while the spring 63 is disposed on the first portion 61a between the stopper 60 and the first movable component 65. The spring 63 has two opposite ends abutted against the stopper 60 and the first movable component 65 respectively.

In this embodiment, the spring 63 is preferably a pre-compressed spring (i.e., pre-stored with elastic energy), that is disposed on the first portion 61a of the spindle 61. Conceivably, the maximum distance between the stopper 60 and the first movable component 65 must not exceed the free length of the spring 63 (i.e., a length of the spring 63 when no compressive force is applied thereon). Thus, the spring 63 is initially constrained at a pre-compressed state so that when the elastic force thereof is released, an axial thrust is applied along the spindle 61. Furthermore, as one end of the spring 63 abuts against the stopper 60 that is fixed, the axial thrust will be applied from the first portion 61a towards the second portion 61b so that the first movable component 65 tends to be forcedly moved towards a direction away from the first portion 61a. However, instead of being limited to a spring, the energy storage device may also be other elements that can store and release energy in other embodiments, and may be readily substituted by those of ordinary skill in the art.

To achieve the aforesaid movement tendency in this embodiment, the spindle 61 is designed with a non-circular cross-section, and the first movable component 65 is formed with a first axial hole (not shown) that also has a non-circular cross-section complementary to that of the spindle 61. By virtue of the first axial hole, the first movable component 65 can be movably disposed on the spindle 61. Conceivably, as the spindle 61 and the first movable component 65 are fitted together by virtue of the respective non-circular cross-sections, the movement of the first movable component 65 on the spindle 61 is restricted. In other words, the first movable component 65 is restricted from rotating about the spindle 61 but is only allowed to displace axially on the spindle 61, i.e., to move in a so-called non-rotating displacement.

Next, the relationships between the first movable component 65 and the second movable component 67 will be further described. Both the first movable component 65 and the second movable component 67 are substantially disposed on the second portion 61b of the spindle 61. Unlike the first movable component 65 which comprises a non-circular first axial hole, the second movable component 67 comprises a second axial hole which has a substantially circular cross-section (not shown) for the spindle 61 to penetrate therethrough. Because the spindle 61 and the second movable component 67 are fitted together by virtue of the second axial hole having a circular cross-section, the second movable component 67 can move in a non-displacing rotation on the spindle 61.

To rotate the second movable component 67 with the first movable component 65, the first movable component 65 and the second movable component 67 are designed to have a first cam structure 651 and a second cam structure 671 respectively. The first cam structure 651 is formed on the first movable component 65 at an end opposite to the spring 63, while the second cam structure 671 is formed on the second movable component 67 at an end abutting against the first cam structure 651. In more detail, each of the cam structures are substantially formed with an inclined surface; i.e., the first cam structure 651 of the first movable component 65 comprises a first inclined surface 651a, and the second cam structure 671 of the second movable component 67 comprises a second inclined surface 671a. The first inclined surface 651a is operatively associated with the second inclined surface 671a in such a way that the second inclined surface 671a can slide relative to the first inclined surface 651a. The first inclined surface 651a further has a first engagement end 651b, while the second inclined surface 671a further has a second engagement end 671b. The second engagement end 671b is operatively associated with the first engagement end 651a in such a way that when the second inclined surface 671a slides to a predetermined extent with respect to the first inclined surface 651a, the second engagement end 671b will be stopped by abutting against the first engagement end 651b.

Figure 7:
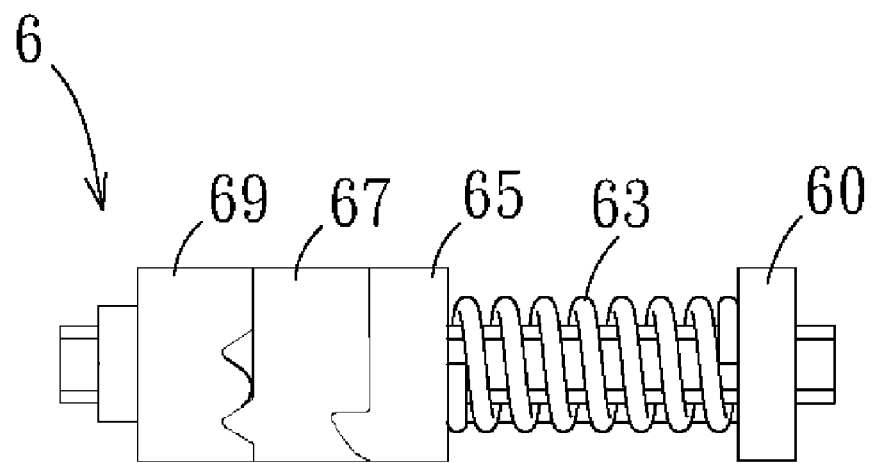
FIG. 7 is a schematic view of the rotating module of this invention in another configuration.

In reference to both FIGS. 6 and 7, in this embodiment, when the spring 63 applies the axial thrust toward the second portion 61b along the spindle 61 so that the first movable component 65 is forced to move in a non-rotating displacement away from the first portion 61a (i.e., towards the second portion 61b), the first movable component 65, which can only move in a non-rotating displacement on the spindle 61, will drive the second movable component 67 to travel in a non-displacing rotation on the spindle 61. In particular, through the interaction of the first cam structure 651 and the second cam structure 671, the second inclined surface 671a of the second movable component 67 is adapted to slide relative to the first inclined surface 651a of the first movable component 65. Consequently, the second cam structure 671 is rotated from a first engagement position shown in FIG. 6 to a second engagement position shown in FIG. 7.

Figure 8:
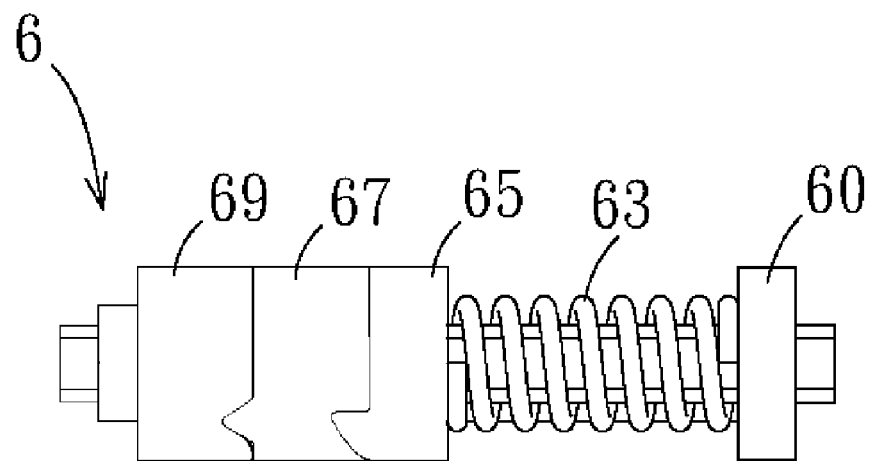
FIG. 8 is a schematic view of the rotating module of this invention in yet another configuration.

In reference to FIGS. 6, 7, and 8, in this embodiment, the rotating module 6 may further comprise a third movable component 69 with a third axial hole (not shown) for the spindle 61 to penetrate therethrough. Similar to the second axial hole of the second movable component 67, the third axial hole of the third movable component 69 also has a substantially circular cross-section. Thus, the third movable component 69 is disposed onto the second portion 61b of the spindle 61 and rotatably engages with the second movable component 67 at an end opposite to the first movable component 65 (i.e., the second movable component 67 is disposed between the first movable component 65 and the third movable component 69). When the second movable component 67 rotates from the first engagement position shown in FIG. 6 to the second engagement position shown in FIG. 7, the third movable component 69 also rotates synchronously with the second movable component 67.

As shown, the second movable component 67 and the third movable component 69 further comprise a male structure 675 and a female structure 691 respectively for operatively associating with each other so that the third movable component 69 is adapted to engage with the second movable component 67. In some cases, the third movable component 69 may also move in a non-displacing rotation relative to the second movable component 67 similarly. For example, the male structure 675 is formed on the second movable component 67 at an end engaged with the third movable component 69, and the female structure 691 is formed on the third movable component 69 at an end engaged with the second movable component 67. In reference to both FIGS. 7 and 8, in this embodiment, the male structure 675 is a protrusion while the female structure 691 comprises at least two recesses. The protrusion is adapted to engage with each of the recesses. When the second movable component 67 and the third movable component 69 are at the second engagement position as shown in FIG. 7, a further external force applied to the third movable component 69 will rotate the third movable component 69 with respect to the second movable component 67 to have the male structure 675 engage with another female structure 691 instead. As a result, the third movable component 69 is rotated from the second engagement position shown in FIG. 7 to the third engagement position shown in FIG. 8 with respect to the second movable component 67. It should be noted that what is illustrated above is only for purposes of description rather than limitation. In other embodiments, the male structure 675 and the female structure 691 may further be other complementary structures. Moreover, there may be more male structures 675 and female structures 691 so that the third movable component 69 can be rotated to more than two engagement positions with respect to the second movable component 67.

With the design of this embodiment, when the first movable component 65 travels in the non-rotating displacement, the second movable component 67 and the third movable component 69 will travel together in the non-displacing rotation accordingly and the third movable component 69 may further rotate with respect to the second movable component 67.

It should be noted that the rotating module 6 disclosed in this embodiment should preferably be a multi-stage hinge assembly, which uses a non-circular spindle 61 in conjunction with the movable components 65, 67, 69 having different axial holes and structures to bring about necessary relative movement. Through the different design of the cross-sections of the axial holes, the inclined surfaces or the cam structures, different directions and angles of rotation may be obtained. Furthermore, in this embodiment, the spindle 61 is fixed while the second movable component 67 and the third movable component 69 can rotate with respect to the spindle 61. However, from the principle of relative movement, arrangements where the third movable component 69 is fixed and the spindle 61 moves relative thereto may also be used in practice, which will be readily appreciated by those of ordinary skill in the art based on concepts of this invention.

Next, the relative movement among the first body portion 21, the second body portion 23 and the rotating module 6 will be further described. In reference to FIGS. 2A to 5B, the second body portion 23 of the portable electronic device 2 is connected to the third movable component 69 of the rotating module 6 by means of a connecting member 25a. The stopper 60 is fixedly and integrally connected to the spindle 61 to form a single piece. The first body portion 21 is connected to the stopper 60 of the rotating module 6 by means of another connecting means 25b. Only one of the rotating modules 6 will be further described below. In the initial closed configuration of the portable electronic device 2, the first body portion 21 and the second body portion 23 abut against each other, i.e., a lower edge 26 of the second body portion 23 abuts against an upper edge 24 of the first body portion 21. Therefore, in this configuration, the rotating module 6 is restricted from any movement, with the energy storage device kept at an energy storage state (e.g., the spring 63 in a pre-compressed state described above).

Furthermore, in reference to FIGS. 3A and 3B, when the keyboard needs to be operated or a wider display field is required, the user may slide the second body portion 23 along the surface 22 of the first body portion 21 under the guide of the sliding module to expose the keyboard (usually arranged on the surface 22). Accordingly, the portable electronic device 2 turns from the closed configuration into an open configuration for the user to input instructions into the portable electronic device 2 through the keyboard. In the closed configuration, the portable electronic device 2 is capable of performing a first operation mode, and when transitioning to the open configuration, the portable electronic device 2 is capable of performing a second operation mode instead, such as making sounds, displaying an image, executing an application, or the combination thereof. If the first operation mode is to display an image in portrait, then when the portable electronic device 2 is switched to the second operation mode, it will be automatically adjusted to display an image in landscape. In other words, the portable electronic device 2 may start or execute corresponding operation modes depending on different configurations.

Once the second body portion 23 guided by the sliding module slides to the position shown in FIGS. 3A and 3B, the detent force generated when the lower edge 26 of the second body portion 23 abuts against the upper edge 24 of the first body portion 21 disappears and the rotating module 6 is no longer restricted from movement. Then, the elastic energy of the spring 63 is released to rotate the second movable component 67 of the rotating module 6 from the first engagement position shown in FIG. 6 to the second engagement position shown in FIG. 7, in which case the portable electronic device 2 exhibits a relative positional relationship between the first body portion 21 and the second body portion 23 as shown in FIGS. 4A and 4B. In reference to both FIGS. 6 and 7, in this stage, due to the engagement of the male structure 675 of the second movable component 67 and the female structure 691 of the third movable component 69, the third movable component 69 rotates synchronously with the second movable component 67 without any relative rotation therebetween. Also, because the stopper 60 is connected integrally to the first body portion 21 by means of the connecting member 25b, the connecting member 25a and the third movable component 69 will automatically result with a corresponding rotation while the first body portion 21 and the connecting member 25b remains stationary. That is, the second body portion 23 will rotate automatically with respect to the first body portion 21 to provide an automatic tilting effect. The rotation that automatically tilts the second body portion 23 takes place until the first engagement end 651b and the second engagement end 671b of the rotating module 6 are engaged with each other (i.e., the second engagement position shown in FIG. 7). At this point, the second body portion 23 forms a first angle $\theta$ with the first body portion 21 (i.e., the aforesaid third position). Substantially, the first angle $\theta$ ranges from 0° to 20°, which is well suitable for the general handheld mode.

In reference to FIGS. 5A and 5B, in this embodiment, the user may further adjust the tilt angle of the second body portion 23 with respect to the first body portion 21. Specifically, by means of the structural design of the female structures 691 of the third movable component 69, the male structure 675 of the second movable component 67 may be switched among the plurality of female structures 691 so that the second body portion 23 can present several tilt angles with respect to the first body portion 21. For example, the user may apply a force to rotate the second body portion 23 from the first angle $\theta$ to a larger second angle $\theta'$ (e.g., the aforesaid fourth position) to trigger the third operation mode. The selection and execution of the third operation mode are similar to those of the second operation mode, and thus will not be further described herein. In practice, the second angle $\theta'$ ranges from 20° to 50°, which is well suitable for the desktop mode where the portable electronic device 2 is placed flat on a table.

Additionally, the female structures 691 of the third movable component 69 and the male structure 675 of the second movable component 67 may be further designed for the second angle $\theta'$ presented by the second body portion 23 is determined by the force applied to the second body portion 23. In reference to FIGS. 6, 7 and 8, in this embodiment, when the force drives the second body portion 23 to a third angle $\theta''$ (not shown) between the first angle $\theta$ and the second angle $\theta'$, the second body portion 23 will automatically rotate to the second angle $\theta'$. In practice, the third angle $\theta''$ is greater than the first angle $\theta$ but not greater than the second angle $\theta'$. In more detail, the effect of rotationally positioning is accomplished by the relative positional relationships between the female structure 691 of the third movable component 69 and the male structure 675 of the second movable component 67. When subjected to the force, the third movable component 69 will rotate with respect to the second movable component 67; i.e., the male structure 675 (i.e., the protrusion) of the second movable component 67 will slide from one recess to another of the female structures 691 and be engaged. If the structure between two adjacent female structures 691 is designed to be a dome portion, then once the male structure 675 slides from the bottom of a recess along the dome portion where the two female structures 691 join with each other and pass through the highest point of the dome portion (i.e., when the second body portion 23 is at the third angle $\theta''$), the protrusion can slide further along the dome portion towards another recess of the female structures 691 by means of the thrust generated by the elastic energy released from the spring 63 and interaction between the male structure 675 and the female structures 691 even if the user stops applying the force to the second body portion 23, thereby rotating the third movable component 69 from the second engagement position to the third engagement position. This corresponds to the following operation configuration of the portable electronic device 2: the second body portion 23 rotates from the aforesaid first tilt angle $\theta$ (the third position) to the third angle $\theta''$ under action of an external force applied, and then automatically tilts to the second angle $\theta'$ (the fourth position), thus accomplishing the click point adjustment. The rotating module 6 of this invention may also have a plurality of click points to satisfy different needs of users and deliver an optimal effect.

Figure 9A:
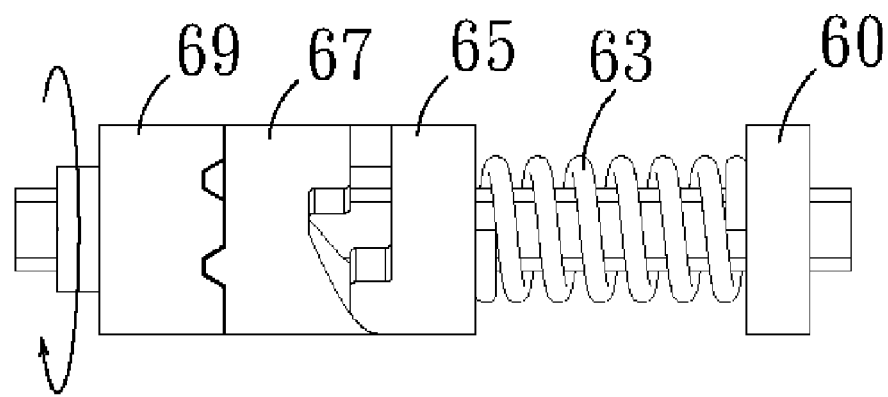
FIGS. 9A and 9B are schematic views of other embodiments of the rotating module of this invention.

It should be noted that the dome portion design between two adjacent female structures 691 is only provided as an example but not for purposes of limitation; rather, the designs of the male structure 675 and the female structures 691 may vary depending on practical needs. For example, in another example of this embodiment, the third angle θ" may be determined by stopping the application of force to the second body portion 23. It should be noted that the third angle θ" set forth herein may be viewed as the second angle θ' described above. In reference to FIG. 9A, the male structure 675 and the female structures 691 are formed of a material with a large friction coefficient, and the protrusion of the male structure 675 and the recesses of the female structures 691 have modified tips so that they are flatter. In addition, the distance between two adjacent female structures 691 of the third movable component 69 is extended to form a flat portion therebetween. In this case, during the rotation of the third movable component 69 from the aforesaid second engagement position to the third engagement position, if the user does not further apply a force, the male structure 675 may temporarily come to a stop on the flat portion of the third movable component 69 (i.e., between the female structures 691) due to the static friction between the protrusion and the flat portion. This provides a stop-as-desired or free stop effect which lasts until the user has decided an optimal viewing angle. In other words, the third angle θ" (may be viewed as the second angle θ' described above) which the second body portion 23 presents with respect to the first body portion 21 may vary depending on the position of the second body portion 23 where the user stops applying the force.

Figure 9B:
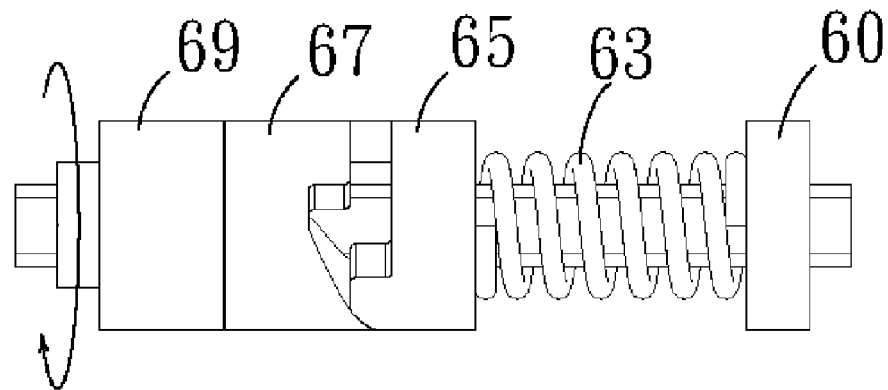

In another example as shown in FIG. 9B, if the respective contact surfaces of the second movable component 67 and the third movable component 69 are formed of materials of a sufficiently large friction coefficient and the spring 63 has a large elastic coefficient (i.e., with large elastic energy), the male structure 675 and the female structures 691 may even be eliminated and, instead, the static friction generated when the contact surfaces of the second movable component 67 and the third movable component 69 abut against each other may be used directly for positioning purposes. In this case, when the third movable component 69 rotates from the aforesaid second engagement position to the third engagement position, the third movable component 69 may temporarily come to a stop on any position with respect to the surface that contact to the second movable component 67 if the user does not further apply a force, thus also accomplishing an effect of free stop. This corresponds to the following operation configuration of the portable electronic device 2: the second body portion 23 is rotated manually from the previous first tilt angle θ (the third position) to the third angle θ" (likewise, it may be viewed as a fourth position corresponding to the aforesaid second angle θ') with an applied external force, thus accomplishing the effect of free stop.

Furthermore, another way to increase the friction between the contact surfaces is to form the recesses of the female structures 691 and the protrusion of the male structure 675 as a plurality of complementary fine structures, e.g., a plurality of complementary fine grooves. Consequently, the second angle θ' or the third angle θ" that the second body portion 67 presents with respect to the first body portion 65 can be adjusted to similarly provide multiple options of relative angles between the second body portion 67 and the first body portion 65. In other words, those skilled in the art may provide the second body portion 23 with diversified tilt angles through different designs of the male structure 675 and the female structures 691.

In reference to FIGS. 2A to 4B, it should be emphasized that during the process of sliding the second body portion 23 from the closed configuration to the open configuration in the embodiments of this invention, the second body portion 23 abuts against the surface 22 of the first body portion 21 when sliding, and due to the complementary and structural relationships among the first body portion 21, the second body portion 23 and the sliding module, the second body portion 23 slides in a direction parallel to the surface 22 of the first body portion 21. During the sliding process, the sliding module 6 is restricted from any movement due to the first body portion 21 and the second body portion 23 abutting against each other. In other words, no additional locking, braking or interfering device is needed to restrict the rotating module 6. This lasts until the second body portion 23 slides to the open configuration, at which point the rotating module 6 is located at the edge of the second body portion 23 and is no longer restricted by the first body portion 21 and the second body portion 23. Then, the energy pre-stored in the rotating module 6 (i.e., the elastic energy stored by the pre-compressed spring 63) is released and the rotating module 6 operates to consequently change the position of the cam structure, so that the second body portion 23 automatically rotates to the first angle θ with respect to the first body portion 21 and, when being subjected to a force, further rotates to the second angle θ'.

Figure 10:
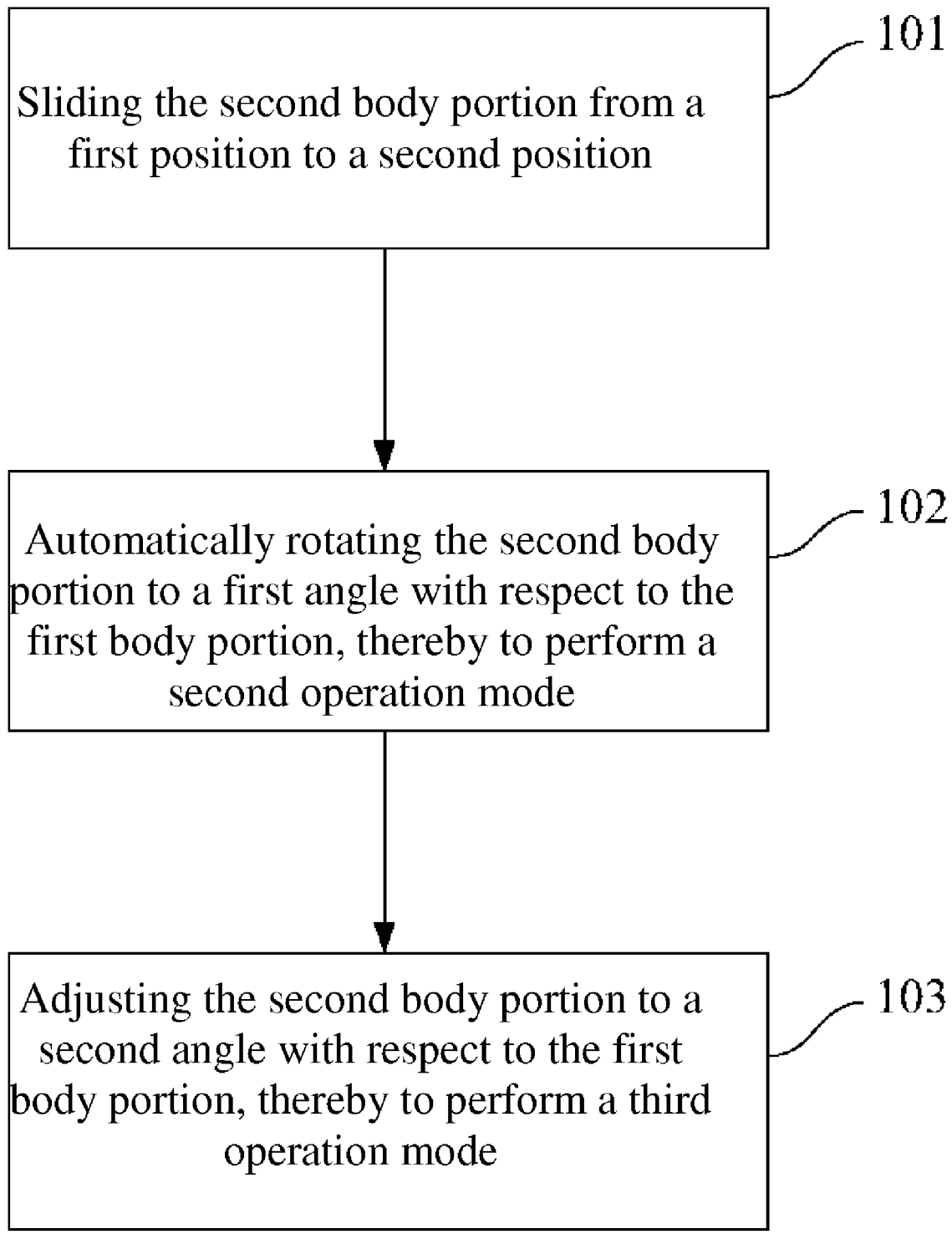
FIG. 10 is a flowchart of a method of operating a portable electronic device of this invention.

Another embodiment of this invention discloses a method of operating a portable electronic device, as shown in FIG. 10. Structures of the portable electronic device to which this method is applicable have already been disclosed in the previous embodiment, and thus will not be further described herein.

In reference to FIGS. 2A to 5B, when the second body portion 23 is at the first position (corresponding to the closed configuration), the portable electronic device 2 is adapted to perform a first operation mode, for example, displaying an image in portrait. In step 101, the second body portion 23 slides from the first position (corresponding to the closed configuration) to the second position (corresponding to the open configuration) over the sliding module along the surface 22 of the first body portion 21. Thus, the keyboard module on the surface 22 of the first body portion 21 is revealed for the user to input instructions into the portable electronic device 2. During the process of sliding from the first position (corresponding to the closed configuration) to the second position (corresponding to the open configuration), the second body portion 23 abuts against the surface 22 of the first body portion 21, so no additional locking, braking or interfering element is needed to restrict the rotating module 6 from movement.

When the second body portion 23 is at the second position, the original detent force generated when the lower edge 26 of the second body portion 23 abuts against the upper edge 24 of the first body portion 21 disappears. Accordingly, in step 102, with the rotating module 6, the second body portion 23 automatically rotates to the third position (corresponding to the first angle θ) with respect to the first body portion 21 to perform a second operation mode. The first angle θ preferably ranges from 0° to 20°. The second operation mode may be making sounds, displaying an image, executing/starting an application, or the combination thereof.

More specifically, when the user operates the portable electronic device 2 to execute steps 101 and 102 with the second body portion 23 at the first angle θ, the portable electronic device 2 may deliver an alerting sound to remind the user of the current operation mode. Alternatively, the portable electronic device 2 may automatically adjust the display mode, for example, to change from the portrait mode in the first operation mode corresponding to the closed configuration to the landscape mode in the second operation mode corresponding to the open configuration, thereby allowing the user to input more complex instructions by the keyboard module. The portable electronic device 2 in the second operation mode may also execute a particular application directly, for example, to start the web browser, the file editor and etc. It should be noted that as can be readily appreciated by those of ordinary skill in the art, the aforesaid second operation mode is only provided for illustration, and can be defined, selected and combined by the user depending on practical needs; thus, this invention has no limitation thereon.

Next, step 103 may be further executed, in which the second body portion 23 is adjusted to the second angle θ' with respect to the first body portion 21 to perform a third operation mode. The second angle θ' is greater than the first angle θ, and preferably ranges from 20° to 50°. In more detail, the step of adjusting the second body portion 23 to the second angle θ' with respect to the first body portion 21 is accomplished by exerting a force to the second body portion 23 at the first angle θ.

As disclosed by the previous embodiment, the process of rotating the second body portion 23 from the first angle θ to the second angle θ' with respect to the first body portion 21 may include at least the following two configurations: (a) the step of adjusting the second body portion 23 to the second angle θ' may be accomplished by exerting the force to the second body portion 23 so that the second body portion 23 presents a third angle θ" between the first angle θ and the second angle θ' and then automatically rotates from the third angle θ" to the second angle θ', thereby accomplishing the so-called click point adjustment; alternatively, (b) through the exertion of force, the second body portion 23 rotates from the first angle θ to the third angle θ" and then the exertion of the force is stopped (in this case, the third angle θ" may be viewed as the second angle θ'), and in this way, a stop-as-desired or free stop effect can be obtained. As described above, when the second body portion 23 is at the second angle θ' or the third angle θ", the portable electronic device 2 may automatically perform the third operation mode. The selection and execution of the third operation mode is similar to those of the second operation mode and, thus, will not be further described herein. Also, the rotating module 6 used for accomplishing the above operation modes as well as the relative movement relationship between the first body portion 21 and the second body portion 23 have already been disclosed clearly in the above embodiment.

According to the above description, in the portable electronic device of this invention, one of the body portions will be tilted at a particular angle automatically subsequent to the relative sliding movement, and then the user may further adjust the body portion to any desired angle despite the different conditions that the device may be used. On the other hand, according to the relative angles presented by the body portions, the portable electronic device may further perform different operation modes correspondingly. Therefore, the device is convenient to use.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A portable electronic device, comprising:
   a first body portion;
   a second body portion;
   a sliding module connecting the first body portion and the second body portion, the sliding module configured to guide the second body portion to slide along a surface of the first body portion from a first position to a second position; and
   a rotating module connecting the first body portion and the second body portion;
      wherein the rotating module is configured to automatically rotate the second body portion from the second position to a third position in which the second body portion is tilted up at a first angle with respect to the first body portion, wherein the rotating module comprises a cam structure connected to the second body portion and operable with a compressed energy storage device such that a release of energy from the energy storage device is capable of moving the cam structure to drive the second body portion to rotate from the second position to the third position; and
      wherein said rotating module is further configured to allow a user to rotate the second body portion from the third position to a fourth position in which the second body portion is tilted up at a second angle with respect to the first body portion, the second angle being greater than the first angle.

2. The portable electronic device as claimed in claim 1, wherein the second body portion is configured to abut against the surface of the first body portion to restrict the rotating module when the second body portion is at the first position.

3. The portable electronic device as claimed in claim 2, wherein the portable electronic device is capable of performing a first operation mode, a second operation mode and a third operation mode when the second body portion is in the first, third and forth positions, respectively.

4. The portable electronic device as claimed in claim 3, wherein the second operation mode or the third operation mode is selected from a group of: making sounds, displaying an image, executing an application or the combination thereof.

5. The portable electronic device as claimed in claim 3, wherein the first operation mode is displaying an image in portrait, and the second operation mode or the third operation mode is displaying an image in landscape.

6. The portable electronic device as claimed in claim 1, wherein the compressed energy storage device is a compressed spring.

7. The portable electronic device as claimed in claim 1, wherein the rotating module is a multi-stage hinge assembly.

8. The portable electronic device as claimed in claim 7, wherein the first angle is up to 20°.

9. The portable electronic device as claimed in claim 8, wherein the second angle substantially ranges from 20° to 50°.

10. The portable electronic device as claimed in claim 9, wherein the second angle is determined by a thrust applied to the second body portion by the user.

11. The portable electronic device as claimed in claim 10, wherein the second angle is determined by stopping applying the thrust to the second body portion.

12. The portable electronic device as claimed in claim 10, wherein the rotating module is configured to drive the second body portion to rotate to the second angle when the thrust drives the second body portion to a third angle, which is larger than the first angle and smaller than the second angle, with respect to the first body portion.

13. The portable electronic device as claimed in claim 7, further comprising a keyboard module disposed on the surface of the first body portion.

14. The portable electronic device as claimed in claim 7, further comprising a power storage device disposed within the first body portion.

15. The portable electronic device as claimed in claim 7, further comprising a display disposed on the second body portion.

16. A method of operating a portable electronic device, the portable electronic device comprising a first body portion and a second body portion having a display, and in which the portable electronic device is capable of performing a first operation mode when the second body portion is in a first position, the portable electronic device further comprising a rotating module, the method comprising steps of:
rotating, by the rotating module, the second body portion to provide the display tilted up at a first angle with respect to the first body portion automatically such that the portable electronic device is configured to perform a second operation mode; and
rotating, by a user, the second body portion to provide the display tilted up at a second angle, which is greater than the first angle, with respect to the first body portion such that the portable electronic device is configured to perform a third operation mode.

17. The method as claimed in claim 16, further comprising:
before the step of rotating the second body portion to the first angle with respect to the first body portion automatically by the rotating module, further comprising a step of:
sliding, by a user, the second body portion from a first position to a second position along a surface of the first body portion prior to rotating the second body portion to the first angle.

18. The method as claimed in claim 17, wherein the step of sliding the second body portion further comprises a step of:
abutting the second body portion against the surface of the first body portion by the portable electronic device on the way of sliding from the first position to the second position to restrict a rotating module from being actuated.

19. The method as claimed in claim 17, wherein the step of rotating the second body portion to the second angle further comprises:
applying a thrust, by the user, to the second body portion at the first angle.

20. The method as claimed in claim 19, wherein the step of applying a thrust to the second body portion further comprises:
applying the thrust to the second body portion until the second body portion is rotated to the second angle with respect to the first body portion.

21. The method as claimed in claim 19, wherein the step of applying a thrust to the second body portion further comprises:
applying the thrust to the second body portion until the second body portion is rotated to a third angle with respect to the first body portion, in which the third angle is larger than the first angle and smaller than the second angle, and the second body portion automatically rotates from the third angle to the second angle.

22. The method as claimed in claim 17, wherein the second operation mode or the third operation mode is selected from the group of: making sounds, displaying an image, executing an application or the combination thereof.

23. The method as claimed in claim 17, wherein the first operation mode is displaying an image in portrait, and the second operation mode or the third operation mode is displaying an image in landscape.

* * * * *